(12) United States Patent
Shih

(10) Patent No.: US 10,924,683 B2
(45) Date of Patent: Feb. 16, 2021

(54) IMAGE PROCESSING METHOD AND IMAGING DEVICE

(71) Applicant: Acer Incorporated, New Taipei (TW)

(72) Inventor: Wei-Kuo Shih, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/679,683

(22) Filed: Nov. 11, 2019

(65) Prior Publication Data

US 2020/0077006 A1    Mar. 5, 2020

Related U.S. Application Data

(62) Division of application No. 15/485,333, filed on Apr. 12, 2017, now Pat. No. 10,536,645.

(30) Foreign Application Priority Data

May 25, 2016   (TW) .............................. 105116223 A

(51) Int. Cl.
*H04N 5/00* (2011.01)
*H04N 5/235* (2006.01)
*G06T 5/00* (2006.01)
*G06T 5/20* (2006.01)
*H04N 5/33* (2006.01)

(52) U.S. Cl.
CPC ........... *H04N 5/2351* (2013.01); *G06T 5/009* (2013.01); *G06T 5/20* (2013.01); *H04N 5/332* (2013.01); *G06T 2207/10024* (2013.01); *G06T 2207/10048* (2013.01)

(58) Field of Classification Search
CPC .................. H04N 5/332; H04N 5/2351; G06T 2207/10048; G06T 2207/10024; G06T 5/20; G06T 5/009
See application file for complete search history.

(56) References Cited

U.S. PATENT DOCUMENTS

| 8,274,710 B2 | 9/2012 | Yano et al. |
| 9,691,211 B2 | 6/2017 | Yamamoto et al. |
| 2003/0137593 A1* | 7/2003 | Watanabe .......... G06K 9/00805 348/274 |

(Continued)

FOREIGN PATENT DOCUMENTS

| CN | 102142224 A | 8/2011 |
| CN | 102291522 A | 12/2011 |

(Continued)

OTHER PUBLICATIONS

Chinese language office action dated Nov. 9, 2016, issued in application No. TW 105116223.

*Primary Examiner* — Zhihan Zhou
(74) *Attorney, Agent, or Firm* — McClure, Qualey & Rodack, LLP

(57) ABSTRACT

An image processing method for processing a first image captured by a camera is provided, in which the first image is retrieved; and an output image is output to an image output circuit after the first image is modified to the output image, wherein a result value of each pixel of the output image is zero or a value generated by subtracting the threshold value from the brightness value of each pixel of the first image.

8 Claims, 4 Drawing Sheets

(56) References Cited

U.S. PATENT DOCUMENTS

| | | | |
|---|---|---|---|
| 2009/0136157 A1* | 5/2009 | Ayala | G09F 19/18 |
| | | | 382/284 |
| 2009/0219381 A1* | 9/2009 | Ayala | H04N 13/243 |
| | | | 348/43 |
| 2009/0323132 A1* | 12/2009 | Yano | H04N 1/4072 |
| | | | 358/466 |
| 2010/0289885 A1* | 11/2010 | Lu | H04N 5/332 |
| | | | 348/61 |
| 2011/0142363 A1* | 6/2011 | Nojima | G06T 7/13 |
| | | | 382/260 |
| 2014/0022376 A1* | 1/2014 | Jung | G01N 21/8851 |
| | | | 348/92 |
| 2014/0063306 A1* | 3/2014 | Scott | H04N 5/359 |
| | | | 348/302 |
| 2016/0065865 A1 | 3/2016 | Shiokawa et al. | |
| 2017/0289466 A1 | 10/2017 | Ge et al. | |

FOREIGN PATENT DOCUMENTS

| | | |
|---|---|---|
| CN | 105144688 A | 12/2015 |
| CN | 105243727 A | 1/2016 |
| CN | 105430363 A | 3/2016 |
| CN | 105635702 A | 6/2016 |
| WO | 2016/041144 A1 | 3/2016 |

* cited by examiner

FIG. 2

| average brightness value | threshold |
|---|---|
| 0 ~ 0.05 | 12 |
| 0.05 ~ 0.10 | 14 |
| 0.10 ~ 0.15 | 16 |
| 0.15 ~ 0.20 | 18 |
| 0.20 ~ 0.25 | 20 |

FIG. 3

IMAGE PROCESSING METHOD AND IMAGING DEVICE

CROSS REFERENCE TO RELATED APPLICATIONS

This application is a Divisional of application Ser. No. 15/485,333, filed Apr. 12, 2017 and entitled "IMAGE PROCESSING METHOD AND IMAGING DEVICE", now U.S. Pat. No. 10,536,645, which is based on, and claims priority from, Taiwan Patent Application No. 105116223, filed on May 25, 2016, the disclosure of which is hereby incorporated by reference herein in its entirety.

BACKGROUND OF THE INVENTION

Field of the Invention

The present invention relates to a technique of cameras, and in particular to a technique of sensors.

Description of the Related Art

For digital imaging and the sensing technology used in capturing digital images, sensing devices are all equipped with sensing abilities for a wide range of wavelengths, so it is necessary to place corresponding filters for different types of light with different wavelength ranges, so that the correct image is obtained by the sensing device. For example, in a visible-light camera or a visible-light device, a band-pass filter corresponding to visible light or an IR cut filter corresponding to visible light is installed prior to the sensing device. The unwanted light is filtered after the light passes through an optical lens group (a band-pass filter or a low-pass filter) and the light irradiates to the sensing device so that a visible image is obtained in response to the sensing device. In an infrared-light camera or an infrared-light device, an IR band-pass filter corresponding to infrared light is installed prior to the sensing device. The other lights (except for the infrared light in the light wavelength) are all filtered so that the infrared image is obtained in response to the sensing device. In order to reduce the cost of the camera and the sensing device, there is a mixed camera integrated with a visible-light camera and an infrared-light camera. In order to obtain a visible image and an infrared image from the same sensing device, the filter must be a dual band-pass filter so that the visible light and the infrared light can pass through the filter at the same time. Thus, both of the visible image and the infrared image are obtained via the elements of the camera. However, the sensing device could response to both visible light and infrared light, the pixels originally used for sensing infrared light sensing visible light, also. As a result, the infrared image can be influenced by and mixed with the image of visible light. The infrared image or picture would come up with extra image which is not supposed to be shown in the infrared image.

BRIEF SUMMARY OF THE INVENTION

The object of the present invention is to decrease the interference of visible light in the infrared image so that accuracy of the infrared image provided to users may be improved.

The present invention provides an image processing method for processing a first image captured by a camera, the method comprising: retrieving the first image; and outputting an output image to an image output circuit after the first image is modified to the output image, wherein a result value of each pixel of the output image is zero or a value generated by subtracting a threshold value from a brightness value of each pixel of the first image.

The present invention also provides an image processing method for processing a plurality of pixels obtained by a camera, wherein the plurality of pixels are combined into a first image. The method comprises retrieving the brightness values of the pixels of the first image; comparing the brightness values of the pixels with a threshold value; when the brightness value of the first pixel is less than the threshold value, outputting zero to serve as a result value of a pixel of an output image, wherein the pixel of the output image corresponds to the first pixel; and outputting the output image to an image output interface.

The present invention provides an imaging device, comprising: a camera, arranged to capture a first image; and an image processor, coupled to the camera, retrieving the first image, and outputting an output image to an image output circuit after the first image is modified to the output image, wherein a result value of each pixel of the output image is zero or a value generated by subtracting the threshold value from the brightness value of each pixel of the first image.

The present invention provides an imaging device, comprising: a camera, arranged to capture a plurality of pixels, wherein the plurality of pixels are combined into a first image; and an image processor, coupled to the camera, wherein the image processor is arranged to: retrieve brightness values of the pixels of the first image; compare the brightness values of the pixels with a threshold value; output zero to serve as a result value of a pixel of an output image when the brightness value of the first pixel among the plurality of pixels is less than the threshold value, wherein the pixel of the output image corresponds to the first pixel; and output the output image to an image output interface.

The present invention can be more fully understood by reading the subsequent detailed description and examples with references made to the accompanying drawings, wherein:

BRIEF DESCRIPTION OF THE DRAWINGS

FIG. 2 is a schematic diagram of a mixer Bayer filter according to an embodiment of the present invention;

FIG. 3 is a mapping table between the average brightness value of a second image and the threshold value according to an embodiment of the present invention;

DETAILED DESCRIPTION OF THE INVENTION

The present invention will be discussed in detail in the examples of a variety of methods described. However, it should be noted that many viable concepts provided by the present invention may be implemented in a variety of specific ranges. These specific examples are merely illustrative of the manufacturing and the usage method of the present invention, but they are not intended to limit the scope of the present invention.

Figure 1:
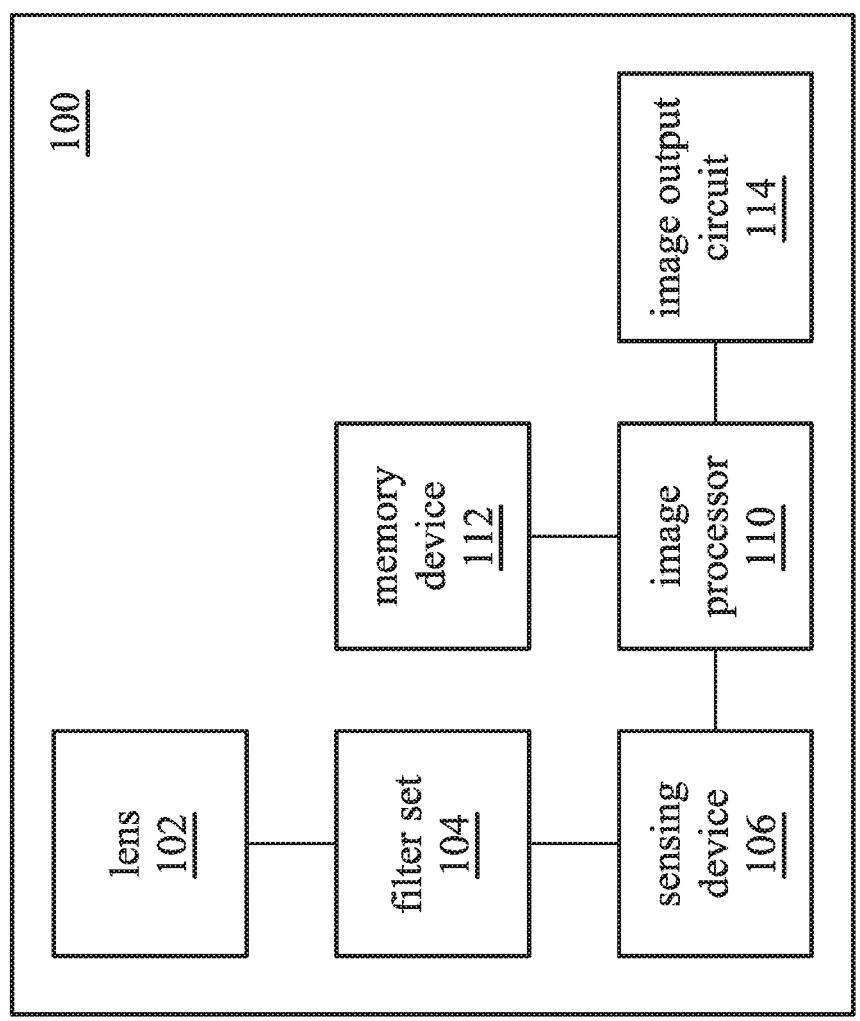
FIG. 1 is a schematic diagram of an imaging device according to an embodiment of the present invention.

FIG. 1 is a schematic diagram of an imaging device according to an embodiment of the present invention. As shown in FIG. 1, the imaging device 100 may be implemented in a variety of computer system configurations (for example: a smartphone, a tablet computer, a personal digital assistant, a notebook, and the like). The imaging device 100 includes a lens 102, a filter set 104, a sensing device 106, an image processor 110, a memory device 112 and an image output circuit 114. The lens 102 usually comprises a set of lens composed of one or more pieces of optical glass (for example: concave lenses, convex lenses, and the combination thereof). The lens 102 is configured to allow light to focus on the sensing device 106 after receiving the light and to allow the light to pass through the filter set 104 before the light irradiates to the sensing device 106. The filter set 104 is composed of different filters (for example: a band-pass filter, a dual band-pass filter, a low-pass filter, and the like). In one embodiment of the present invention, the filter set 104 is composed of the dual band-pass filter and the mixed Bayer filter. The dual band-pass filter allows light with a specific frequency band to pass through. In one embodiment of the present invention, the dual band-pass filter only allows infrared light and visible to light pass through. The detailed structure of the mixed Bayer filter is described in FIG. 2. The sensing device 106 can be a complementary metal-oxide-semiconductor (CMOS) sensing device or a charge-coupled device (CCD). In one embodiment of the present invention, the sensing device 106 includes at least one first region corresponding to the filter set 104 (the mixed Bayer filter) and at least one second region corresponding to the filter set 104 (the mixed Bayer filter).

Figure 2:
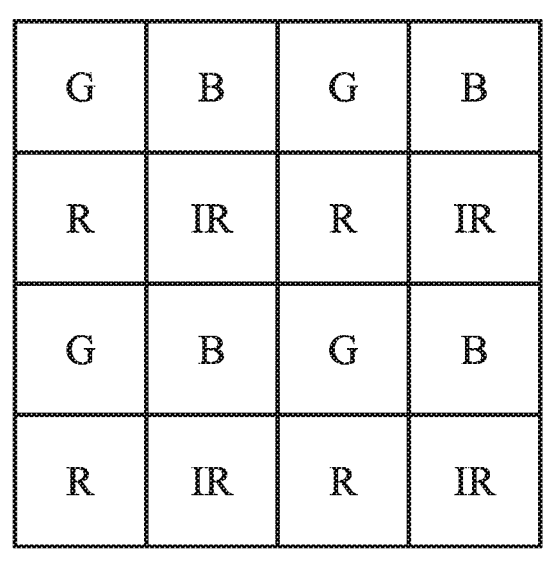

FIG. 2 is a schematic diagram of a mixer Bayer filter according to an embodiment of the present invention. The mixer Bayer filter is composed of a plurality of RGB-IR arrays arranged in a repeating pattern. In one embodiment of the present invention, one mixer Bayer filter is composed of four RGB-IR arrays, but it is not intended to limit the scope of the present invention. The RGB-IR array is composed of an RGB array and an IR array. For example, each filter device of the RGB-IR array is represented by a letter, wherein letter "R" represents a red light filter device, letter "G" represents a green light filter device, letter "B" represents a blue light filter device, and letter "IR" represents an infrared light filter device. Each filter device can allow light with the corresponding wavelength or corresponding color to pass through. The RGB-IR array is composed of the red light filter device, the green light filter device, the blue light filter device, and the infrared light filter device. In one embodiment of the present invention, the mixed Bayer filter includes at least one first region and at least one second region, and the first region and the second region respectively allow light of different specific wavelengths to pass through, so that the light of different specific wavelengths can be transmitted to the sensing device 106. In one embodiment of the present invention, the first region is configured to allow infrared light (830 nm-870 nm) to pass through, and the second region is configured to allow visible light (400 nm-680 nm) to pass through. In one embodiment of the present invention, the first image is generated by the light passing through at least one first region of the band-pass filter and the mixed Bayer filter. In one embodiment of the present invention, the second image is generated by the light passing through at least one second region of the band-pass filter and the mixed Bayer filter. In one embodiment of the present invention, the first image is an infrared image, and the second image is a visible image.

Back to the FIG. 1, the image processor 110 may comprise a single central processing unit (CPU) or a plurality of parallel processing units related to a parallel processing environment. In one embodiment of the present invention, the image processor 110 modifies a plurality of brightness values of the first image to a plurality of result values of an output image according to a threshold value, and transmits the plurality of result values of the output image to the image output circuit 114. The details will be described later. The memory device 112 comprises a read-only memory (ROM), a flash ROM and/or a random access memory (RAM). Generally, the program modules often contain routines, programs, objects, components, and the like to perform the functions of dynamic information transmission or reception. In one embodiment of the present invention, the memory device 112 is configured to store a threshold value, wherein the threshold value varies with different environments or is a fixed value. In another embodiment of the present invention, a mapping table can be stored in the memory device 112. The mapping table is configured to store the relationship between the average brightness value of the second image and the threshold value, and the details will be described in FIG. 3. The image output circuit 114 is configured to receive the plurality of result values of the output image so that the other devices (not shown in FIG. 1) of the imaging device 100 can perform a series of backend processes. For example, the backend processes can comprise color correction, gamma correction, and/or edge enhancement.

In one embodiment of the present invention, the image processor 110 retrieves the brightness value of each pixel of the first image, and outputs the output image to the image output circuit 114 after the first image is modified to the output image, wherein the output image has a plurality of result values corresponding to the brightness value of each pixel of the first image, and result values of the pixels of the output image are generated by subtracting the threshold value from the brightness values of the corresponding pixels of the first image. However, zero replaces any one of the result values when any one of the results values of is less than zero. For example, the brightness value of one pixel of the first image is 27 Nit, and the threshold value is 18 Nit, so the result value corresponding to the brightness value of the pixel of the first image is 9 Nit. While the brightness value of one pixel of the first image is 17 Nit, and the threshold value is 18 Nit, the result value corresponding to the brightness value of the pixel of the first image is 0 Nit, not −1 Nit, and so on. Finally, the plurality of result values of the output image is received by the image output circuit 114 so that the other devices (not shown in FIG. 1) of the imaging device 100 can perform a series of backend processes, wherein the decision of the threshold value will be described later.

In another embodiment of the present invention, the image processor 110 sets all result values of the output image to zero when the brightness value of each pixel of the first image is all less than the threshold value. For example, the brightness value of one pixel of the first image is 5 Nit, and the threshold value is 18 Nit, so the result value corresponding to the brightness value of the pixel of the first image is 0 Nit, not −13 Nit. The brightness value of another pixel of the first image is 3 Nit, and the threshold value is 18 Nit, while the result value corresponding to the brightness value of the another pixel of the first image is 0 Nit, not −15 Nit, and so on. Finally, the plurality of result values of the output image is received by the image output circuit 114 so that the other devices (not shown in FIG. 1) of the imaging device 100 can perform a series of backend processes.

In one embodiment of the present invention, the threshold value is determined according to the type of the material of the filter set 104 because the filter set 104 is composed of various materials. Namely, the threshold value is determined as the fixed value when the imaging device 100 is out of the factory. Although the filter set 104 is made of the same materials, its spectral characteristics may differ slightly due to the different composition ratios of the materials. In one embodiment of the present invention, the threshold value is between 10% and 20% of the brightness value of the brightest pixel of the first image. For example, the threshold value is a fixed value between 1 Nit and 2 Nit if the brightness value of the brightest pixel of the first image is 10 Nit. In another embodiment of the present invention, the threshold value is a value between 1% and 10% of a theoretical maximum brightness value of any pixel of the first image. For example, the theoretical maximum brightness value of any pixel of the first image is 100 Nit, so the threshold value is a value between 1 Nit and 10 Nit. In another embodiment of the present invention, the threshold value is 1.66% of the theoretical maximum brightness value of any pixel of the first image, wherein the theoretical maximum brightness value is the value that the brightness value from full dark to full light after the pixel is irradiated by the light. For example, the theoretical maximum brightness value of any pixel of the first image is 100 Nit, and the threshold value is 1.66 Nit.

In another embodiment of the present invention, the threshold value is determined according to the environment of the imaging device 100. Namely, there are different threshold values in different environments in the imaging device 100. For example, the lens 102 captures a second image when the first image is captured, a subject is recorded by the first image and the second image through light with different wavelengths, and a value of threshold value varies with brightness values of different pixels of the second image. In another embodiment of the present invention, the value of threshold value varies with an average brightness value of the different pixels of the second image. A mapping table between an average brightness value of a second image and the threshold value is shown in FIG. 3.

FIG. 3 is a mapping table between the average brightness value of a second image and the threshold value according to an embodiment of the present invention. As shown in FIG. 3, the threshold value corresponding to the average brightness value of the second image is 12 Nit when the average brightness value of the second image is between 0 Nit and 0.05 Nit. The threshold value corresponding to the average brightness value of the second image is 14 Nit when the average brightness value of the second image is between 0.05 Nit and 0.10 Nit. The threshold value corresponding to the average brightness value of the second image is 16 Nit when the average brightness value of the second image is between 0.10 Nit and 0.15 Nit. The threshold value corresponding to the average brightness value of the second image is 18 Nit when the average brightness value of the second image is between 0.15 Nit and 0.20 Nit. The threshold value corresponding to the average brightness value of the second image is 20 Nit when the average brightness value of the second image is between 0.20 Nit and 0.25 Nit. The subsequent corresponding relationship can be inferred, but it is not limited to the present invention. In another embodiment of the present invention, the average brightness value of the second image is calculated and obtained through a mathematical formula. For example, when the average brightness value of the second image is 0.05 Nit, the image processor 110 multiplies 0.05 Nit by a specific coefficient "a" to obtain a result value 0.05a Nit and the result value 0.05a is served as the threshold value corresponding to the average brightness value of the second image. When the average brightness value of the second image is 0.25 Nit, the image processor 110 multiplies 0.25 Nit by the specific coefficient "a" to obtain a result value 0.25a Nit and the result value 0.25a is served as the threshold value corresponding to the average brightness value of the second image. The subsequent corresponding relationship can be inferred so on, but it is not limited to the present invention.

The brightness value is in unit of Nit. However, the output value obtained by the sensing device can also be represented in digital form directly, but only for digital photography. As a result, the brightness value of the pixel can be performed in digital form, such as 10 bits or 8 bits, and it does not influence the implementation of the specific embodiment.

Figure 4:
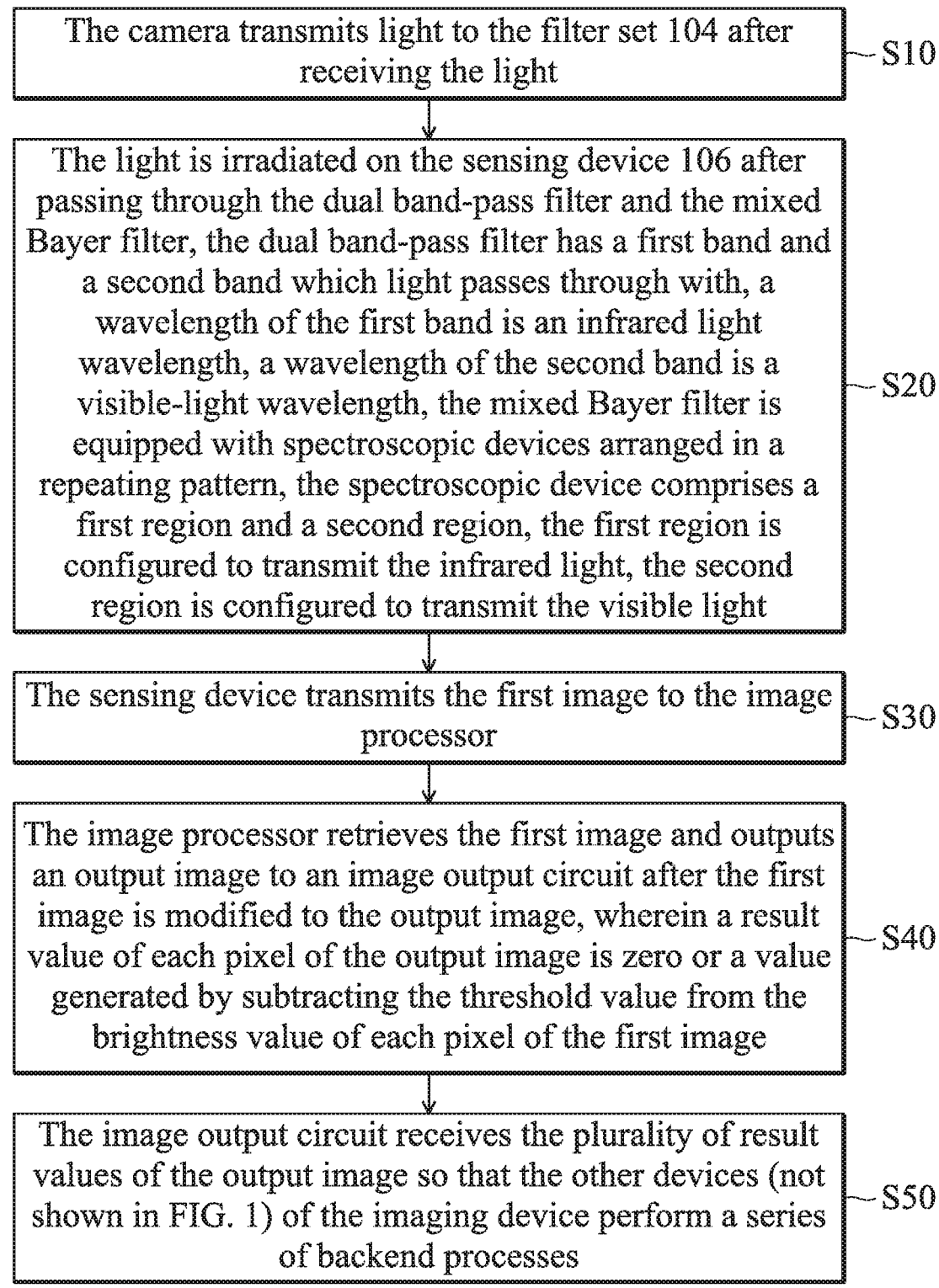
FIG. 4 is a flowchart of an operating method of an imaging device according to an embodiment of the present invention.

FIG. 4 is a flowchart of an operating method of an imaging device according to an embodiment of the present invention. First, in step S10, the lens 102 transmits light to the filter set 104 after receiving the light, and then the flowchart goes to step S20. In step S20, the light is irradiated on the sensing device 106 after passing through the dual band-pass filter and the mixed Bayer filter, the dual band-pass filter has a first band and a second band which light passes through with, a wavelength of the first band is an infrared light wavelength, a wavelength of the second band is a visible-light wavelength, the mixed Bayer filter is equipped with spectroscopic devices arranged in a repeating pattern, the spectroscopic device comprises a first region and a second region, the first region is configured to transmit the infrared light, the second region is configured to transmit the visible light, and then the flowchart goes to step S30. In step S30, the sensing device 106 transmits the first image to the image processor 110, and the flowchart goes to S40. In step S40, the image processor 110 retrieves the first image and outputs an output image to an image output circuit 114 after the first image is modified to the output image, wherein a result value of each pixel of the output image is zero or a value generated by subtracting the threshold value from the brightness value of each pixel of the first image. Finally, the flowchart goes to step S50. In step S50, the image output circuit 114 receives the plurality of result values of the output image so that the other devices (not shown in FIG. 1) of the imaging device 100 perform a series of backend processes.

The method of the present invention, or certain aspects or portions thereof, may exist in the form of program code. The program code can be stored in physical media, such as floppy discs, hard disk, or any other machine-readable (computer-readable) storage media, or one that is not limited to the external form of a computer program product. When the program code is executed (for example: loaded by a computer), this machine is becoming involved in the device of the present invention. The program code can also be transmitted through some transmission media, such as a wire or cable, fiber optics, or any transmission patterns used for transmission. When the program code is received, loaded and executed by a machine (such as a computer), the machine becomes an apparatus for practicing the invention. When a general-purpose processor is implemented, the program code combines with the processor to provide a unique apparatus that operates similar to application-specific logic circuits.

The previous description of the disclosure is provided to enable any person skilled in the art to make or use the disclosure. Various modifications to the disclosure will be readily apparent to those skilled in the art, and the generic principles defined herein can be applied to other variations without departing from the scope of the disclosure. Thus, the disclosure is not intended to be limited to the examples and designs described herein, but are to be accorded the widest scope consistent with the principles and novel features disclosed herein.

What is claimed is:

1. An image processing method for processing a plurality of pixels obtained by a camera, wherein the plurality of pixels are combined into a first image, the method comprising:

retrieving brightness values of the plurality of pixels of the first image by an imaging device;

comparing the brightness values of the plurality of pixels with a threshold value by the imaging device;

when the brightness value of a first pixel of the plurality of pixels is less than the threshold value, outputting zero to serve as a result value of a pixel of an output image, wherein the pixel of the output image corresponds to the first pixel; and outputting the output image to an image output interface by the imaging device;

wherein the imaging device comprises a dual band-pass filter, a mixed Bayer filter and a sensing device, the dual band pass filter, the mixed Bayer filter and the sensing device are arranged in a line so that light is irradiated on the sensing device after passing through the dual band pass filter and the mixed Bayer filter, the dual band-pass filter has a first band and a second band that allow light to pass, a wavelength of the first band is an infrared light wavelength, a wavelength of the second band is a visible-light wavelength, the mixed Bayer filter is equipped with spectroscopic devices arranged in a repeating pattern, the spectroscopic device comprises a first region and a second region, the first region is configured to transmit the infrared light, the second region is configured to transmit the visible light, and the first image is generated after light passes through the dual band-pass filter and the first region.

2. An imaging device, comprising:

a camera, arranged to capture a plurality of pixels, wherein the plurality of pixels are combined into a first image; and an image processor, coupled to the camera, wherein the image processor is arranged to:

retrieve brightness values of the plurality of pixels of the first image;

compare the brightness values of the plurality of pixels with a threshold value;

output zero to serve as a result value of a pixel of an output image when the brightness value of a first pixel of the plurality of pixels is less than the threshold value, wherein the pixel of the output image corresponds to the first pixel; and output the output image to an image output interface;

wherein the imaging device comprises a dual band-pass filter, a mixed Bayer filter and a sensing device, the dual band pass filter, the mixed Bayer filter and the sensing device are arranged in a line so that light is irradiated on the sensing device after passing through the dual band pass filter and the mixed Bayer filter, the dual band-pass filter has a first band and a second band that allow light to pass, a wavelength of the first band is an infrared light wavelength, a wavelength of the second band is a visible-light wavelength, the mixed Bayer filter is equipped with spectroscopic devices arranged in a repeating pattern, the spectroscopic device comprises a first region and a second region, the first region is configured to transmit the infrared light, the second region is configured to transmit the visible light, and the first image is generated after light passes through the dual band-pass filter and the first region.

3. The imaging device as claimed in claim 2, wherein the threshold value is between 10% and 20% of a brightness value of a brightest pixel of the first image.

4. The imaging device as claimed in claim 2, wherein the threshold value is between 1% and 10% of a theoretical maximum brightness value of any pixel of the first image.

5. The imaging device as claimed in claim 2, wherein the threshold value is 1.66% of a theoretical maximum brightness value of any pixel of the first image.

6. The imaging device as claimed in claim 2, wherein the camera captures a second image when capturing the first image, a subject is recorded by the first image and the second image through light with different wavelengths, and the threshold value varies with brightness values of different pixels of the second image.

7. The imaging device as claimed in claim 6, wherein the value of threshold value varies with an average brightness value of the different pixels of the second image.

8. The imaging device as claimed in claim 6, wherein the first image is an infrared image, and the second image is a visible image.

* * * * *